United States Patent [19]
Weaver et al.

[11] Patent Number: 5,962,557
[45] Date of Patent: Oct. 5, 1999

[54] POLYESTERS CONTAINING COPOLYMERIZED SUBSTITUTED 1,4-BIS(2, 6-DIALKYLANILINO)-9, 10-ANTHRAQUINONES AS COLORANTS

[75] Inventors: Max Allen Weaver, Kingsport; Brian Edison Maxwell, Johnson City; Gerry Foust Rhodes, Piney Flats; James John Krutak, Sr., Kingsport, all of Tenn.

[73] Assignee: Eastman Chemical Corporation, Kingsport, Tenn.

[21] Appl. No.: 08/906,643

[22] Filed: Aug. 7, 1997

Related U.S. Application Data

[60] Provisional application No. 60/027,389, Sep. 30, 1996.

[51] Int. Cl.$^6$ .............. C08G 63/685; C08G 63/688; C08B 69/10
[52] U.S. Cl. .............. 524/35; 525/167; 525/425; 525/437; 525/438; 525/439; 525/440; 525/442; 525/443; 528/288; 528/289; 528/290; 528/291; 528/292
[58] Field of Search .................... 528/288, 290, 528/291, 292, 289; 525/437, 167, 425, 438, 439, 440, 442, 443; 524/35

[56] References Cited

U.S. PATENT DOCUMENTS

| | | |
|---|---|---|
| 3,488,195 | 1/1970 | Hunter . |
| 3,666,778 | 5/1972 | Hohmann et al. . |
| 3,849,139 | 11/1974 | Hibino et al. . |
| 3,918,976 | 11/1975 | Arai et al. . |
| 4,025,492 | 5/1977 | Binsack et al. . |
| 4,136,089 | 1/1979 | Bier et al. . |
| 4,176,224 | 11/1979 | Bier et al. . |
| 4,208,572 | 6/1980 | Melgaard . |
| 4,238,593 | 12/1980 | Duh . |
| 4,359,570 | 11/1982 | Davis ............................... 528/289 |
| 4,403,092 | 9/1983 | Davis et al. . |
| 5,372,864 | 12/1994 | Weaver et al. . |

OTHER PUBLICATIONS

Bykov, A. N. et al.: "Synthesis and study of the properties of colored dyes on the structure of colored poly(ethylene terephthalate)" ISV. Vyssh. Ucheb. Zaved., Khim. Tekhnol., vol. 17, No. 6, 1974, USSR, pp. 910–912, XP002050566 & Chemical Abstracts, vol. 82, No. 10, Mar. 10, 1975, Columbus, Ohio, US; abstract No. 58308.

R.E. Wilfong, Journal of Polymer Science, 54 385 (1961).

*Primary Examiner*—Patricia A. Short
*Attorney, Agent, or Firm*—Harry J. Gwinnell; Jonathan D. Wood

[57] ABSTRACT

A colored polyester copolymer comprising the reaction product of at least one linear thermoplastic polyester precursor and at least ten parts per million by weight of a residue of at least one 1,4-bis (2,6-dialkylanilino)-9,10-anthraquinone colorant. A composition may be formed comprising the copolymer in admixture with at least one thermoplastic polymer. The copolymer may be formed by reacting at least one thermoplastic polyester precursor with a 1,4-bis (2,6-dialkylanilino)-9,10-anthraquinone colorant which has a polyester reactive group.

20 Claims, No Drawings

POLYESTERS CONTAINING COPOLYMERIZED SUBSTITUTED 1,4-BIS(2, 6-DIALKYLANILINO)-9, 10-ANTHRAQUINONES AS COLORANTS

RELATED APPLICATION

This application is based upon and claims the priority of provisional application 60/027,389, filed Sep. 30, 1996.

BACKGROUND OF THE INVENTION

1. Field of the Invention

The present invention relates to colored polyester copolymer compounds and compositions. The greenish-blue to bluish-green (cyan) colored polyesters of the invention have thermally stable colorants copolymerized therein, thus providing colored compounds and compositions wherein the colorants do not sublime, extract, migrate, or exude. The copolymerized colorants have adequate color characteristics (hue) and are stable to heat, light, humidity and a variety of other environmental factors. These compositions are particularly useful as films and fibers.

2. Description of the Prior Art

It is known in the art to incorporate dyes into polyester films as contrasting agents. Dyes in the blue to blue-green color range have primarily been chosen from the anthraquinone family of dyes due to their thermal stability. Dyes acre typically added to the polyester during processing and must be stable to the temperature and chemical environment encountered during polyester processing. Anthraquinone dyes are described in U.S. Pat. Nos. 3,488, 195 and 3,849,139, which are incorporated herein by reference. However, in these cases, the dyes are admixed with the polyester and are not copolymerized with the polyester.

It is also known in the art to copolymerize certain colorants into polyesters as described in U.S. Pat. Nos. 4,403,092 and 5,372,864. Copolymerized colorants are non-migratory, thereby eliminating the problems of sublimation and interference of the dye with the film. The method disclosed for preparing copolymerizable colorants described in these patents involves the addition of hydroxyl containing sulfamido groups to the anilino substituents on the A ring of the anthraquinone of the Formula I:

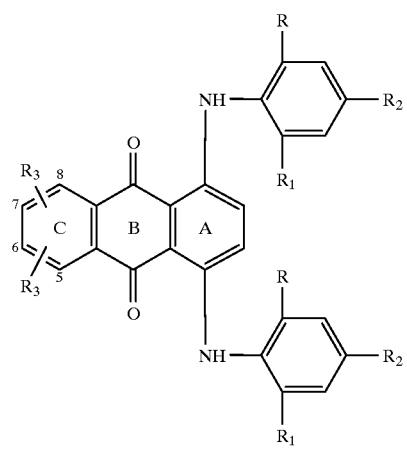

Addition of sulfamido groups causes hypsochrornic shifts resulting in colorants with a reddish hue which are unsuitable for this invention. When incorporated in fibers or film, the known copolymerizable blue colorants flare redder when exposed to tungsten filament light as compared to daylight, which is objectionable.

It has now been found that, in contrast to the copolymerized blue anthraquinone colorants disclosed in U.S. Pat. Nos. 4,403,092 and 5,372,864, the colorants used in this invention produce cyan colored polyesters directly without having to blend them with more bathochromic colorants such as phthalocyanines. The colored polyester copolymer compositions of the present invention are economical, environmentally and toxicologically safe, and the color is fast to heat, light, high humidity and a variety of environmental factors. Thus, many of the known problems with polyesters which contain copolymerized blue dyes are overcome by this invention.

SUMMARY OF THE INVENTION

This invention provides a colored polyester copolymer which comprises the reaction product of at least one linear thermoplastic polyester precursor and at least ten parts per million by weight of a residue of at least one 1,4-bis (2,6-dialkylanifino)-9, 10-anthraquinone colorant having the formula:

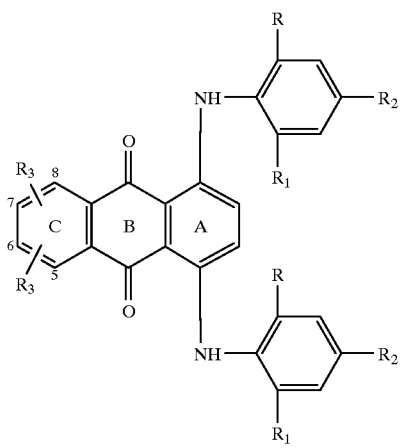

wherein:
R and $R_1$ are independently $C_1$–$C_6$ alkyl;
$R_2$ groups are independently hydrogen, halogen, $C_1$–$C_6$ alky, hydroxy, $C_1$–$C_6$ alkoxy, thiocyano or $C_1$–$C_6$ alkylthio;
$R_3$ groups are independently substituted or unsubstituted $C_1$–$C_6$ alkylthio, substituted or unsubstituted $C_1$–$C_6$ alkylsulfonyl, substituted or unsubstituted $C_1$–$C_6$ alkylsulfinyl, substituted or unsubstituted phenylthio, substituted or unsubstituted phenylsulfinyl, substituted or unsubstituted phenylsulfonyl, 1,2,4-triazol-5-yl, or substituted or unsubstituted heteroarylthio, wherein at least one $R_3$ comprises at least one polyester reactive group capable of reacting with the polyester precursor to form a colored polyester copolymer.

This invention also provides a composition which comprises at least one thermoplastic polymer in admixture with the above colored polyester copolymer.

This invention further provides a method of preparing a colored polyester copolymer which comprises reacting at least one linear thermoplastic polyester precursor and at least ten parts per million by weight of a residue of at least one 1,4-bis (2,6-dialkylanilino)-9,10-anthraquinone colorant having the above Formula I under polyester forming conditions to form a colored polyester copolymer.

DETAILED DESCRIPTION OF THE PREFERRED EMBODIMENT

In the practice of the present invention, a colored polyester copolymer is prepared which comprises the reaction product of a linear polyester precursor and a colorant of at least one 1,4-bis (2,6-dialkylanilino)-9,10-anthraquinones having the Formula I:

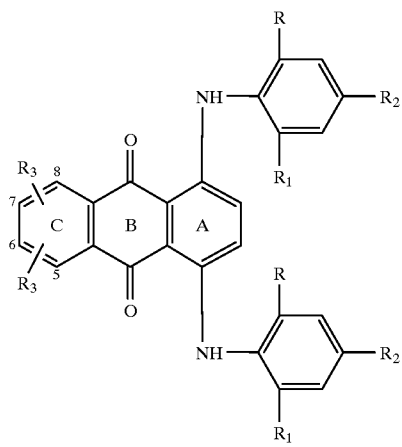

wherein:

R and $R_1$ are independently $C_1$–$C_6$ alkyl;

$R_2$ groups are independently hydrogen, halogen, $C_1$–$C_6$ alkyl, hydroxy, $C_1$–$C_6$ alkoxy, thiocyano or $C_1$–$C_6$ alkylthio;

$R_3$ groups are independently substituted or unsubstituted $C_1$–$C_6$ alkylthio, substituted or unsubstituted $C_1$–$C_6$ alkylsulfonyl, substituted or unsubstituted $C_1$–$C_6$ alkylsulfinyl, substituted or unsubstituted phenylthio, substituted or unsubstituted phenylsulfinyl, substituted or unsubstituted phenylsulfonyl, 1,2,4-triazol-5-yl, or substituted or unsubstituted heteroarylthio, wherein at least one $R_3$ comprises at least one polyester reactive group capable of reacting with the polyester precursor to form a colored polyester copolymer.

In the preferred embodiment, the alkyl portion of $C_1$–$C_6$-alkyl, $C_1$–$C_6$-alkoxy, and $C_1$–$C_6$-alkylthio comprises a straight or branched chain alkyl radical containing one to six carbon atoms, more preferably one to four carbons.

Preferred halogens nonexclusively include fluorine, chlorine, bromine, and iodine, most preferably bromine and chlorine.

The polyester reactive groups referred to herein describe groups which are reactive with at least one of the functional groups from which the polyester is prepared under polyester forming conditions. The preferred polyester reactive groups nonexclusively include hydroxy, carboxy, carbomethoxy, carbethoxy and acetoxy. When $R_3$ is 1,2,4-triazol-5-ylthio, the —NH—portion of the triazol ring is reactive under polyester forming conditions.

The two $R_3$ groups in Formula I are preferably located at either positions 6 and 7 or positions 5 and 8 in Ring C of the anthraquinone structure, most preferably at positions 6 and 7. Compounds in which $R_3$ is an alkylthio group substituted with hydroxy are useful as textile dyes and are broadly disclosed in U.S. Pat. No. 3,666,778, which is incorporated herein by reference.

The terms substituted $C_1$–$C_6$-alkylsulfonyl, substituted $C_1$–$C_6$-alkylthio, and substituted $C_1$–$C_6$-alkylsulfinyl referred to herein denote radicals wherein the alkyl portion is substituted with at least one polyester reactive group X which is capable of reaction via esterification with either an alcohol or ester, preferably said polyester reactive groups nonexclusively includes hydroxy, carboxy, amino and $C_1$–$C_6$-alkylamino or ester groups selected from any radical having the formula —$OCOR_4$,—$OCO_2R_4$,—$CO_2R_4$, or —$OCONHR_4$ wherein $R_4$ nonexclusively includes $C_1$–$C_6$-alkyl, hydroxy-$C_1$–$C_6$-alkyl, $C_3$–$C_7$-cycloalkyl and phenyl; or the $C_1$–$C_6$-alkyl group of $R_3$ may bear a substituent of the formula —Y—$R_5$—X, wherein Y nonexclusively includes—O, —S, and $SO_2$; $R_5$ nonexclusively includes straight or branched chain $C_1$–$C_6$-alkylene and 1,2-, 1,3- or 1,4- phenylene, and X is a polyester reactive group as described above; the $C_1$–$C_6$-alkyl groups of $R_3$ which contain reactive groups X or the group —Y—$R_5$—X, as defined above, may contain at least one additional substituent which nonexclusively includes hydroxy, halogen, —$OCOR_4$, $C_1$–$C_6$-alkoxy and $C_1$–$C_6$-alkylthio.

The terms substituted phenylthio, substituted phenylsulfinyl, and substituted phenylsulfonyl referred to herein indicate groups wherein the phenyl radical contains at least one group comprising a reactive group X which nonexclusively includes —$OCOR_4$ and —$CO_2R_4$ or a group of the formula —Y—$R_5$—X, wherein $R_4$, Y, $R_5$ and X are as defined previously. The phenyl radical containing the reactive group X or the group —Y—$R_5$—X, as defined above, may contain at least one additional substituent which nonexclusively includes $C_1$–$C_6$-alkyl, $C_1$–$C_6$-alkoxy, halogen, carboxy and —$CO_2R_4$.

The term heteroarylthio referred to herein indicates groups wherein the heteroaryl radical comprises benzothiazol-2-yl, benzoxazol-2-yl, benzimidazol-2-yl, thiazolyl-2-yl or 1,3,4-thiadiazolyl-2-yl radical substituted with carboxy or —$CO_2R_4$, wherein $R_4$ is as defined above; or a substituted triazolylthio group of the Formula II:

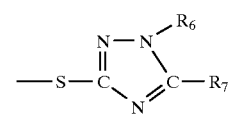

wherein:

$R_6$ represents hydrogen or a $C_1$–$C_6$-alkyl radical containing at least one polyester reactive group X, wherein X is as previously defined; $R_7$ represents a $C_1$–$C_6$ alkyl or phenyl radical. The heteroarylthio groups may be substituted further with additional groups listed above as possible substituents for the phenyl group.

The blue anthraquinone colorants of Formula I can be prepared by reacting the appropriately substituted leucoquinizarin (1,4,9,10-tetrahydroxyanthracene) compound of the Formula III:

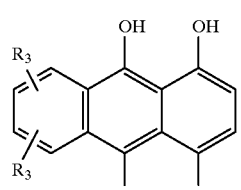

with 2,6-dialkylaniline of the Formula IV:

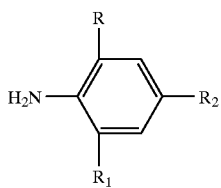

preferably in the presence of acid catalysts such as boric acid as described in U.S. Pat. No. 3,918,976, incorporated herein by reference.

Alternatively, the blue anthraquinone colorants of Formula I may be prepared by reacting dihalo- 1,4-bis-(2,6-dialkylanilino)-9,10-anthraquinones of the formula:

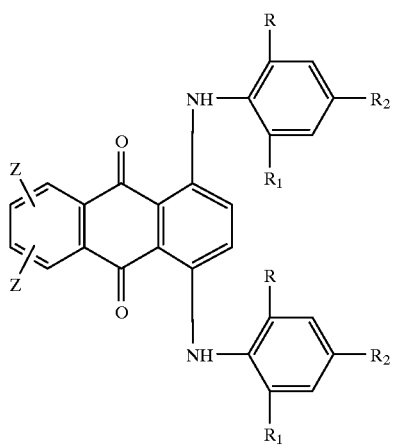

with the appropriately substituted $C_1$–$C_6$-alkylmercaptan, $C_1$–$C_6$-alkane suifinic acid salt, benzenethiol, benzenesulfonic acid salt or heteroarylthiol, in the presence of base in solvents such as N,N-dirnethylformamide, N,N-dimethyacetamide, N-methyl-2-pyrrolidinone and dimethylsulfoxide.

Preferred polyesters nonexclusively include linear, thermoplastic, crystalline, or amorphous polyesters produced by conventional polymerization techniques from at least one diol and at least one dicarboxylic acid.

In the preferred embodiment, the polyesters are molding or fiber grade and have an inherent viscosity of from about 0.4 to about 1.2 (dL/g) measured at 25° C. in a 60/40 ratio by weight of phenol/tetrachloroethane. These polyesters are more fully disclosed in U.S. Pat. No. 5,372,864, which is incorporated herein by reference. Suitable diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol, and the like. In general, these diols contain 2 to 18, preferably 2 to 8 carbon atoms. Cycloaliphatic diols can be employed in their cis or trans configuration or as mixtures of both forms. Suitable acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In polymer preparation, it is often preferable to use a functional acid derivative thereof such as the dimethyl, diethyl, or dipropyl ester of the dicarboxylic acid. The anhydrides or acid halides of these acids also may be employed where practical. Preferred polyesters comprise at least about 50 mole percent terephthalic acid residues and at least about 50 mole percent ethylene glycol and/or 1,4-cyclohexanedimethanol residues. Particularly preferred polyesters are those containing from about 75 to 100 mole percent terephthalic acid residues and from about 75 to 100 percent ethylene glycol residues. The linear polyesters may be prepared according to polyester forming conditions well known in the art. For example, a mixture of one or more dicarboxylic acids, preferably aromatic dicarboxylic acids, or ester forming derivatives thereof, and one or more diols may be heated in the presence of esterification and/or polyesterification catalysts at temperatures in the range of about 150° C. to about 300° C., and pressures of atmospheric to about 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

Typical catalyst or catalyst systems for polyester condensation are well-known in the art. For example, catalysts disclosed in U.S. Pat. Nos. 4,025,492; 4,136,089; 4,176,224; 4,238,593; and 4,208,572, incorporated herein by reference, are deemed suitable in this regard. Further, R. E. Wilfong, Journal of Polymer Science, 54 385 (1961) sets forth typical catalysts which are useful in polyester condensation reactions. A preferred temperature range for a polyester condensation is about 260° C. to about 300° C.

The preferred amount of copolymerizable colorant added during polyester manufacture depends upon the inherent tinctorial strength of the colorant and the end use of the polyester. For polyesters to be used in films such as in the blow molding of bottles for packaging usually ranges from about 10 parts per million (ppm) to about 10,000 ppm, preferably from about 10 ppm to about 1,000 ppm, more preferably from about 100 ppm to about 750 ppm, and most preferably from about 100 ppm to about 400 ppm. For polyester fibers, the usual amount of colorant would normally range from about 500 ppm to about 10,000 ppm. In another embodiment of the invention, a polyester color concentrate may be prepared by copolymerizing higher levels of the colorant usually in the range of about 0.1% to about 30% by weight based on the weight of the final polyester. Cyan colorants may be combined with magenta or yellow colorants to produce blue or green, respectively, thus allowing a wide range of colors to be produced.

When the colorants are added at high levels, it is preferred that the copolymerizable colorants have only two polyester reactive groups to avoid crosslinking of the polymer during the polycondensation reaction. At low levels of addition, e.g. below about 1,000 ppm, the colorant may have only one or more than two reactive groups without affecting the desirable polymer properties of the linear polyesters.

These polyester color concentrates may be blended with thermoplastics, specifically polyesters to impart the desired level of color by melt blending followed by extrusion. The colored thermoplastic compositions thus produced are useful as thick and thin plastic films, extruded coatings and lamination layers, plastic sheeting, molded plastic articles and fibers. Useful thermoplastic polymers non-exclusively include polyesters, polyurethanes, polycarbonates, polyethers, polystyrenes, polyolefins, acrylics, vinyls, cellulosics, epoxies, phenolics, polyamines, polyamides and mixtures thereof The amount of colored polyester useful in blends with thermoplastic polymers may be readily determined by those skilled in the art. When blended with thermoplastic polymers to form thermoplastic compositions, the amount of colored polyester copolymer may range from about 10 ppm to about 10 weight % preferably from about 100 ppm to about 5 weight % by weight of the thermoplastic composition.

The following nonlimiting preparations and examples illustrate the practice of the invention.

PREPARATION 1

Preparation of 6,7-dichloro- 1,4,9,10-tetrahydroxyanthracene [6,7-Dichloroleucoquinizarin](Compound 1 of Table 4):

Ten grams (32.35 mmol) of 6,7-dichloro- 1,4-dihydroxyanthraquinone were pulverized with enough $NH_4OH$ to make a paste. This was transferred to a 500 mL round bottom (RB) flask, using additional $NH_4OH$ to make the reaction mixture 0.13–0.16 M. While stirring, 6.72 grams (38.60 mmol) sodium hydrosulfite were added portionwise over 1.5 hours. Immediately after addition, the mixture was heated slowly to 55° C. on a steam bath, then heated at 55° C. for about 1.5 hours. After cooling to room temperature, the mixture was filtered, washed twice with water, and pulled dry on the funnel for a brief period. The product was dried overnight in a vacuum oven at 55–65° C. FDMS showed a mixture of starting material and product. This mixture was carried on to compound 2 of Table 1.

PREPARATION 2

Preparation of 1,4-Bis(2,6-diethylanilino)-6,7-dichloro-9,10-anthraquinone(Compound 2 of Table 1):

A 300 mL RB flask was charged with the following: 8.68 grams (27.90 mmol) of compound 1 of Table 1, 30 mL glacial acetic acid, 4.99 grams (80.71 mmol) boric acid, and 25 mL (151.77 mmol) 2,6-diethylaniline. This mixture was heated to reflux with stirring for 3 hours, then the water of reaction and acetic acid were distilled off leaving a paste in the flask. The resulting product was isolated by filtration, taken up in boiling ethanol and 5.00 grams (32.49 mmol) sodium perborate were added portionwise. The mixture was cooled and filtered. (Isolated yield=50%. FDMS shows a major ion at 570. UV-Vis spectrum gives a max of 638 nm ($\epsilon$=19,633), 592 nm ($\epsilon$=17,319) in methylene chloride.

PREPARATION 3

Preparation of 1,4-Bis(2,6-diethylanilino)-6,7-bis(2-hydroxuethylthio)-9,10-anthraquinone (Compound 3 of Table 1):

An aliquot (0.5 gram) of compound 2 of Table 1(0.87 mmol) was placed in a 25 mL RB flask. To this was added, 0.17 gram 2-mercaptoethanol (2.18 mmol), 0.52 g potassium carbonate (3.76 mmol), and 5 mL dimethyl formamide (DMF). The mixture was heated to 100° C. for 4 hours. The hot mixture was poured into 100 mL $H_2O$, acidified with a 10% HCl solution, and filtered. Isolated yield=75%. FDMS shows a major ion at 654. UV-Vis spectrum gives max=641 nm ($\epsilon$=18,052), 594 nm ($\epsilon$=16,073) in methylene chloride.

PREPARATION 4

Preparation of 6,7-Bis(2-carboxyphenylthio)- 1,4-bis(2,6-diethylanilino)-9,10-anthraquinone (Compound 4 of Table 1):

An aliquot (0.5 gram) of compound 2 of Table 1 (0.87 mmol) was placed in a 25 mL RB flask. To this was added, 0.34 grams thiosalicylic acid (2.21 mmol), 0.52 g potassium carbonate (3.76 mmol), and 5 mL DMF. The mixture was heated to 100° C. for 18 hours. The hot mixture was poured into 100 mL $H_2O$, acidified with a 10% HCl solution, and filtered. Isolated yield=45%. FDMS shows a major ion at 806. UV-Vis spectrum gives max=649 nm ($\epsilon$=4,100), 602 nm ($\epsilon$=4,005) in methylene chloride.

PREPARATION 5

Preparation of 1,4-Bis(2,6-diethylanilino)-6,7-bis(1,2,4-triazol-3-ylthio)-9,10-anthraquinone (Compound 5 of Table 1):

In a 25 mL flask were mixed 0.50 g (0.87 mmol) of compound 2 of Table 1,1.00 g (7.24 mmol) of potassium carbonate, and 0.40 g (3.95 mmol) 3-mercapto-1,2,4-triazole in 10 mL of DMF. This mixture was stirred and heated to 100° C. for ca. 6 hours. The mixture was cooled to ca. 40° C. and poured into a large excess of water. The water was made acidic through the addition of 10% HCl then filtered. The solids were dried to give compound 5. FDMS reported a single ion at 700. UV-Vis spectrum gives max=650 nm ($\epsilon$=14,354), 603 nm ($\epsilon$=13,108) in methylene chloride.

PREPARATION 6

Preparation of 1,4-Bis(2,6-diethylanilino)-6,7-bis(2-hydroxyethylsulfoxide)-9, 10-anthraquinone (Compound 6 of Table 1):

A 0.1 g aliquot of compound 3 was mixed with acetic acid (3.0 mL) and 30% hydrogen peroxide (0.5 g) and the reaction mixture was heated at about 950° C. for 15 minutes. Water was added to the cooled reaction mixture. The sticky solid thus produced, was washed with water and then with methanol by decantation. After drying in air, 0.1 g of solid cyan colorant was obtained. FDMS showed a major ion at 686 for the bis sulfoxide(6), with minor ions at 702 (one sulfoxide and one sulfone) and at 718 (bis sulfone).

EXAMPLE 1

The following materials were placed in a 500 mL, round-bottom flask:

190.70 g (0.75 mole) bis-(2-hydroxyethyl) terephthalate 0.0288 g (200 ppm) colorant of Preparation 3

0.0072 g Ti from a n-butanol solution of acetyl-triisopropyl titanate

The flask was purged with nitrogen and then immersed into a Belmont metal bath at 215° C. The temperature was increased to 285° C. over about 20 minutes, with stirring initiated as soon as the solids of the flask had melted. The pressure was then reduced in stages over about 15 minutes to 1.0 torr. The polycondensation reaction was continued with stirring at 1.0 torr for 40 minutes. The flask was then pressurized to atmospheric pressure with nitrogen and removed from the metal bath.

After being removed from the flask the polymer was ground in a Wiley mill to pass through a 3 mm screen. The cyan colored polymer thus prepared contained about 200 ppm of the copolymerized colorant. A portion (2.0 g) of the polymer granules was compression molded into a film, approx. 25 mils thick, using a 2-inch diameter, circular mold at 285° F. and 4500 pounds ram force (4 inch ram) in a Pasadena Hydraulic, Inc. press. The molds with the pressed film were quenched in water so the film remained amorphous and had a desirable cyan color.

EXAMPLE 2

The procedure of Example 1 was repeated using 0.0288 g (200 ppm) of the colorant of Preparation 4 to produce polyester polymer granules, a portion of which was compression molded as in Example 1 to produce a cyan colored film.

EXAMPLE 3

The procedure of Example 1 was repeated using 0.0288 g (200 ppm) of the colorant of Preparation 5 to produce polyester polymer granules, a portion of which was compression molded as described in Example 1 to produce a cyan colored film. The hue of the film was slightly greener when observed under Tungsten filament light as compared to direct sunlight.

The polyester polymers may also be prepared from the desired dicarboxylic acid/diol or dicarboxylic ester/diol and the polyester reactive colorants by known procedures. The colorants may be added before or after the esterification/transesterification steps.

TABLE 1

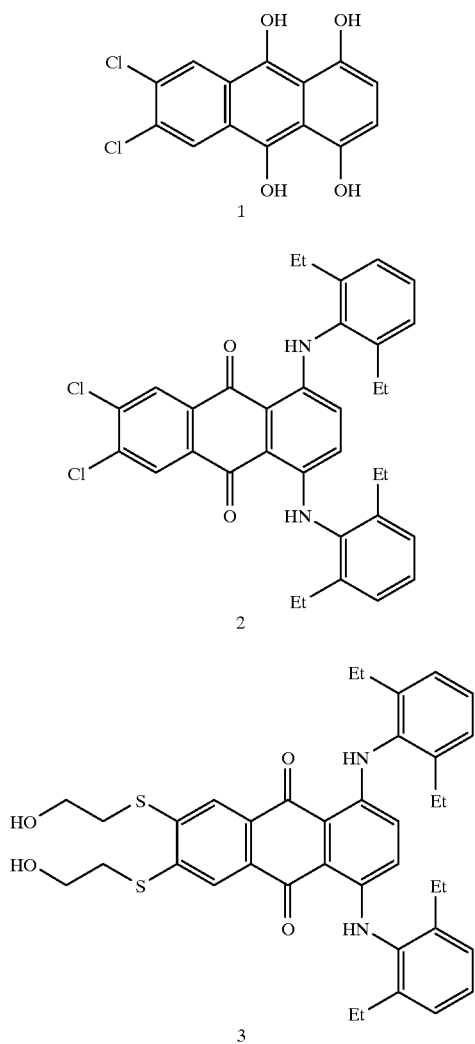

TABLE 1-continued

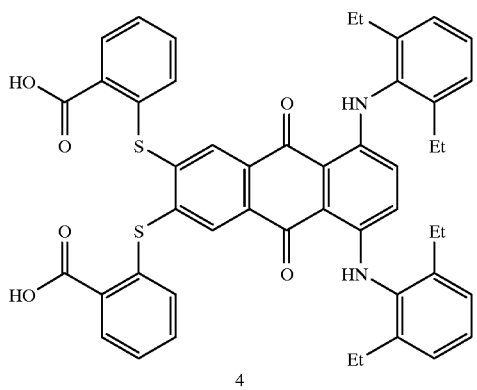

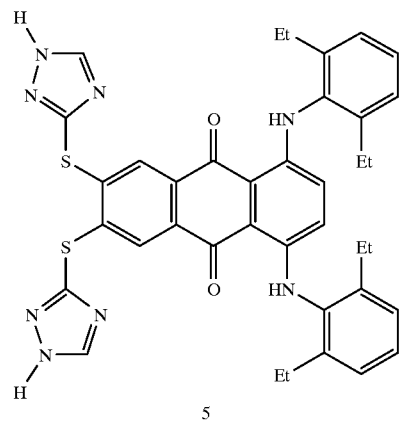

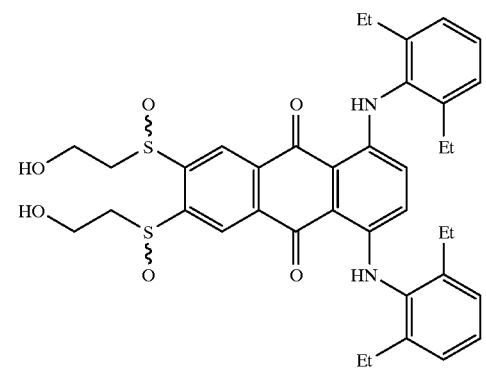

TABLE 2

SUBSTITUTED 1,4-BIS(2,6-DIALKYLANILINO) ANTHRAQUINONES

| Colorant No. | R | $R_1$ | $R_2$ | (Positions on Ring C) - $R_3$ |
|---|---|---|---|---|
| 7 | $C_2H_5$ | $C_2H_5$ | H | (6,7)-$SCH_2CH_2OCOCH_3$ |
| 8 | $C_2H_5$ | $C_2H_5$ | H | (6,7)-$SCH_2C(CH_3)_2CH_2OH$ |
| 9 | $C_2H_5$ | $C_2H_5$ | H | (6,7)-$SCH_2CH_2OCH_2CH_2OH$ |
| 10 | $C_2H_5$ | $C_2H_5$ | H | (6,7)-$SO_2(CH_2)_4OH$ |
| 11 | $C_2H_5$ | $C_2H_5$ | H | (5,8)-$SCH_2CH_2OH$ |
| 12 | $C_2H_5$ | $C_2H_5$ | H | (5,8)-S—$C_6H_4$-4-$CO_2H$ |
| 13 | $C_2H_5$ | $C_2H_5$ | H | 6,7-S—$C_6H_4$-4-$CO_2CH_3$ |
| 14 | $C_2H_5$ | $C_2H_5$ | H | 5,8-$S(CH_2)_4CO_2CH_3$ |
| 15 | $C_2H_5$ | $C_2H_5$ | H | 5,8-$SO_2C_6H_4$-4-$CO_2CH_3$ |
| 16 | $C_2H_5$ | $CH_3$ | H | 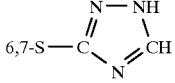 |
| 17 | $CH_3$ | $CH_3$ | $CH_3$ | 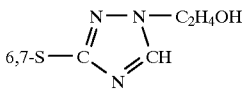 |
| 18 | $CH_3$ | $CH_3$ | $CH_3$ | 6,7-$SCH_2CH_2OH$ |
| 19 | $CH_3$ | $CH_3$ | $CH_3$ | 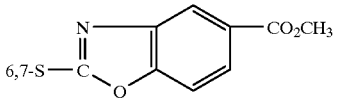 |
| 20 | $CH_3$ | $CH_3$ | $CH_3$ | 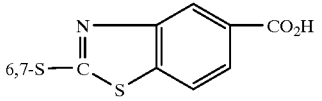 |
| 21 | $CH_3$ | $CH_3$ | $CH_3$ | 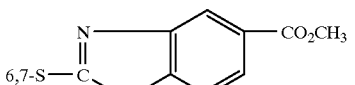 |
| 22 | $CH_3$ | $CH_3$ | $CH_3$ | 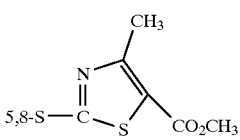 |
| 23 | $CH_3$ | $CH_3$ | $CH_3$ |  |
| 24 | $CH_3$ | $CH_3$ | OH | 6,7-$SCH_2CH_2OCO_2C_2H_5$ |
| 25 | $C_2H_5$ | $C_2H_5$ | Br | 6,7-$SCH_2CH_2OCONHC_2H_5$ |
| 26 | $C_2H_5$ | $C_2H_5$ | Cl | 6,7-$SCH_2CH(OH)CH_2Cl$ |
| 27 | $C_2H_5$ | $C_2H_5$ | $OCH_3$ | 6,7-$SCH_2CH(OH)CH_2OH$ |
| 28 | $C_2H_5$ | $C_2H_5$ | $SC_6H_{13}$-n | 6,7-$SCH_2C_6H_4$-4-$CO_2CH_3$ |
| 29 | $C_2H_5$ | $C_2H_5$ | SCN | 5,8-$SCH_2CH_2OC_6H_4$-4-$OC_2H_5$ |
| 30 | $C_2H_5$ | $C_2H_5$ | $OC_4H_9$-n | 6,7-$SO_2(CH_2)_6OCOCH_3$ |
| 31 | $C_2H_5$ | $C_2H_5$ | H | (6,7)-$SC_6H_3$-3,5-$diCO_2H$ |
| 32 | $C_2H_5$ | $C_2H_5$ | H | (6,7)-$SO_2C_6H_3$-3,5-$diCO_2CH_3$ |
| 33 | $C_2H_5$ | $C_2H_5$ | H | (6,7)-S—$C_6H_3$-2-$CO_2H$-4-$CH_3$ |
| 34 | $C_2H_5$ | $C_2H_5$ | H | (6,7)-$SC_6H_3$-2-Cl-4-$CO_2H$ |
| 35 | $C_2H_5$ | $C_2H_5$ | H | (6,7)-$SC_6H_4$-4-$OC_2H_4OH$ |
| 36 | $C_2H_5$ | $C_2H_5$ | H | (6,7)-$SC_6H_4$-4-S—$CH_2CH_2OH$ |

TABLE 2-continued

SUBSTITUTED 1,4-BIS(2,6-DIALKYLANILINO) ANTHRAQUINONES

| Colorant No. | R | $R_1$ | $R_2$ | (Positions on Ring C) - $R_3$ |
|---|---|---|---|---|
| 37 | $C_2H_5$ | $C_2H_5$ | H | (6,7)-$SC_6H_4$-4-$SO_2C_2H_4OH$ |
| 38 | $C_2H_5$ | $C_2H_5$ | H | (6,7)-$SO_2C_2H_4OC_2H_4OH$ |
| 39 | $C_2H_5$ | $C_2H_5$ | H | (6,7)-$SCH_2CH_2SCH_2CH_2OCOCH_3$ |
| 40 | $C_2H_5$ | $C_2H_5$ | H | (6,7)-$S(CH_2)_4O(CH_2)_4OH$ |
| 41 | $C_2H_5$ | $C_2H_5$ | H | (6,7)-$SO_2(CH_2)_4O(CH_2)_4OH$ |
| 42 | $C_2H_5$ | $C_2H_5$ | H | (6,7)-$SO_2CH_2C(CH_3)_2CH_2OH$ |
| 43 | $C_2H_5$ | $C_2H_5$ | H |  |
| 44 | $C_2H_5$ | $C_2H_5$ | H | 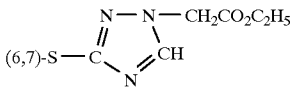 |
| 45 | $C_2H_5$ | $C_2H_5$ | H | 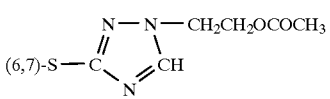 |
| 46 | $C_2H_5$ | $C_2H_5$ | H | 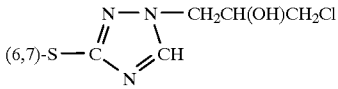 |
| 47 | $C_2H_5$ | $C_2H_5$ | H | (6,7)-$SC_6H_4$-4-$CH_2CO_2CH_3$ |
| 48 | $C_2H_5$ | $C_2H_5$ | H | (6,7)-$SC_6H_4$-4-$OCH_2CO_2CH_3$ |
| 49 | $C_2H_5$ | $C_2H_5$ | H | (6,7)-$SC_6H_4$-4-$SCH_2CO_2CH_3$ |
| 50 | $C_2H_5$ | $C_2H_5$ | H | (6,7)-$SO_2C_6H_4$-4-$OCH_2CO_2H$ |
| 51 | $C_2H_5$ | $C_2H_5$ | H | 6,7-$SC_6H_4$-4-$OCOCH_3$ |

What is claimed is:

1. A colored polyester copolymer which comprises the reaction product of at least one linear thermoplastic polyester precursor and at least ten parts per million by weight of a residue of at least one 1,4-bis (2,6-dialkylanilino)-9,10-anthraquinone colorant having the formula:

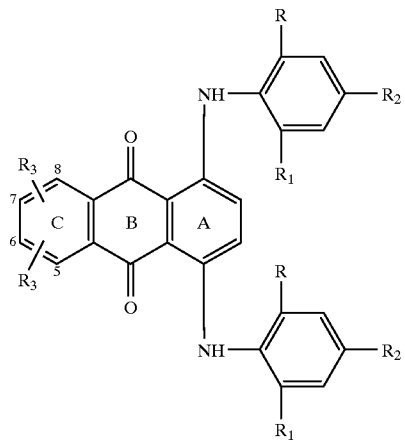

wherein:

R and $R_1$ are independently $C_1$–$C_6$ alkyl;

$R_2$ groups are independently selected from the group consisting of hydrogen, halogen, $C_1$–$C_6$ alkyl, hydroxy, $C_1$–$C_6$ alkoxy, thiocyano or $C_1$–$C_6$ alkylthio;

$R_3$ groups are independently selected from the group consisting of substituted or unsubstituted $C_1$–$C_6$ alkylthio, substituted or unsubstituted $C_1$–$C_6$ alkylsulfonyl, substituted or unsubstituted $C_1$–$C_6$ alkylsulfinyl, substituted or unsubstituted phenylthio, substituted or unsubstituted phenylsulfinyl, substituted or unsubstituted phenylsulfonyl, 1,2,4-triazol-5-yl, or substituted or unsubstituted heteroarylthio, wherein at least one $R_3$ comprises at least one polyester reactive group capable of reacting with the polyester precursor to form a colored polyester copolymer.

2. The colored polyester copolymer of claim 1 which comprises:

(a) a diacid residue comprised of at least 80 mole percent of a diacid selected from the group consisting of terephthalic acid, isophthalic acid, 1,4-cyclohexanedicarboxylic acid, 2,6-naphthalenedicarboxylic acid, or mixtures thereof;

(b) a diol residue of at least 80 mole percent of a glycol selected from the group consisting of ethylene glycol, diethylene glycol, neopentyl glycol, 1,4-butanediol, 1,4-cyclohexanedimethanol, or mixtures thereof.

3. The colored polyester copolymer of claim 1 which has an inherent viscosity of from about 0.4 to about 1.2 (dL/g)

measured at 25° C. in a 60/40 ratio by weight of phenol/ tetrachloroethane.

4. The colored polyester copolymer of claim 2 which has an inherent viscosity of from about 0.4 to about 1.2 (dL/g) measured at 25° C. in a 60/40 ratio by weight of phenol/ tetrachloroethane.

5. The colored polyester copolymer of claim 1 wherein the colorant comprises from about 0.1 weight percent to about 30.0 weight percent of the copolymer.

6. The colored polyester copolymer of claim 1 wherein each $R_3$ group comprises a polyester reactive group.

7. The colored polyester copolymer of claim 1 wherein the $C_1$–$C_6$ alkyl, $C_1$–$C_6$ alkoxy, and $C_1$–$C_6$ alkylthio groups have from 1 to 4 carbon atoms.

8. The colored polyester copolymer of claim 1 wherein the halogen is fluorine, chloride, bromine, or iodine.

9. The colored polyester copolymer of claim 1 wherein the halogen is bromine or chlorine.

10. The colored polyester copolymer of claim 1 wherein the $R_3$ groups are located at positions 6 and 7 of Ring C.

11. The colored polyester copolymer of claim 1 wherein the colorant is present in an amount from about 10 ppm to about 10,000 ppm by weight of the copolymer.

12. The colored polyester copolymer of claim 1 wherein the colorant is present in an amount from about 100 ppm to about 400 ppm by weight of the copolymer.

13. The colored polyester copolymer of claim 1 wherein the colorant is present in an amount from about 500 ppm to about 10,000 ppm by weight of the copolymer.

14. The colored polyester copolymer of claim 1 which is in the form of a molded article, a film, a fiber or a sheet.

15. A composition which comprises at least one thermoplastic polymer in admixture with a colored polyester copolymer which copolymer comprises the reaction product of at least one linear thermoplastic polyester precursor and at least ten parts per million by weight of a residue of at least one 1,4-bis (2,6-dialkylanilino)-9,10-anthraquinone colorant having the formula:

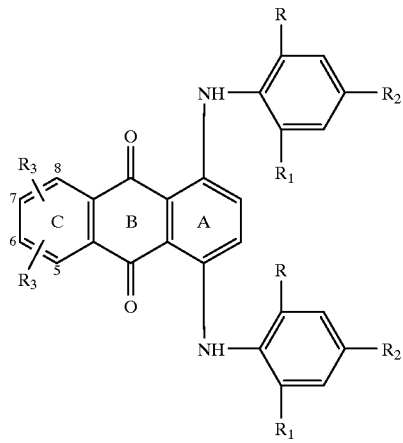

wherein:

R and $R_1$ are independently $C_1$–$C_6$ alkyl;

$R_2$ groups are independently selected from the group consisting of hydrogen, halogen, $C_1$–$C_6$ alkyl, hydroxy, $C_1$–$C_6$ alkoxy, thiocyano or $C_1$–$C_6$ alkylthio;

$R_3$ groups are independently selected from the group consisting of substituted or unsubstituted $C_1$–$C_6$ alkylthio, substituted or unsubstituted $C_1$–$C_6$ alkylsulfonyl, substituted or unsubstituted $C_1$–$C_6$ alkylsulfinyl, substituted or unsubstituted phenylthio, substituted or unsubstituted phenylsulfinyl, substituted or unsubstituted phenylsulfonyl, 1,2,4-triazol-5-yl, or substituted or unsubstituted heteroarylthio, wherein at least one $R_3$ comprises at least one polyester reactive group capable of reacting with the polyester precursor to form a colored polyester copolymer.

16. The composition of claim 15 wherein the thermoplastic polymer comprises a polyester, polyurethane, polycarbonate, polyether, polystyrene, polyolefin, acrylic, vinyl, cellulosic, epoxy, phenolic, polyamine, polyamide or mixtures thereof.

17. The composition of claim 15 wherein the colored polyester copolymer is present in an amount from about 10 ppm to about 10% by weight of the composition.

18. The composition of claim 15 wherein the composition is formed by melt blending followed by extrusion.

19. The composition of claim 15 which is in the form of a molded article, a film, a fiber or a sheet.

20. A method of preparing a colored polyester copolymer which comprises reacting at least one linear thermoplastic polyester precursor and at least ten parts per million by weight of a residue of at least one 1,4-bis (2,6-dialkylanilino)-9,10-anthraquinone colorant having the formula:

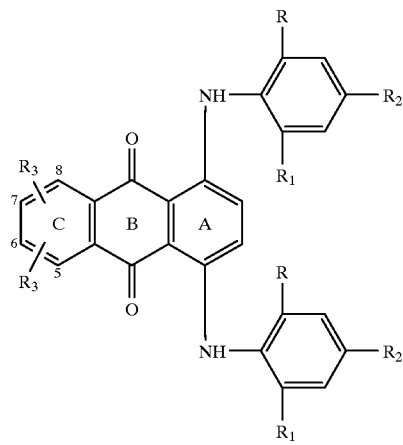

wherein:

R and $R_1$ are independently $C_1$–$C_6$ alkyl;

$R_2$ groups are independently selected from the group consisting of hydrogen, halogen, $C_1$–$C_6$ alkyl, hydroxy, $C_1$–$C_6$ alkoxy, thiocyano or $C_1$–$C_6$ alkylthio;

$R_3$ groups are independently selected from the group consisting of substituted or unsubstituted $C_1$–$C_6$ alkylthio, substituted or unsubstituted $C_1$–$C_6$ alkylsulfonyl, substituted or unsubstituted $C_1$–$C_6$ alkylsulfinyl, substituted or unsubstituted phenylthio, substituted or unsubstituted phenylsulfinyl, substituted or unsubstituted phenylsulfonyl, 1,2,4-triazol-5-yl, or substituted or unsubstituted heteroarylthio, wherein at least one $R_3$ comprises at least one polyester reactive group capable of reacting with the polyester precursor to form a colored polyester copolymer under polyester forming conditions.

* * * * *